United States Patent
Brondijk

(10) Patent No.: US 7,602,676 B2
(45) Date of Patent: Oct. 13, 2009

(54) METHOD FOR RECORDING A LEAD-OUT ON AN OPTICAL DISC

(75) Inventor: Robert Albertus Brondijk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 526 days.

(21) Appl. No.: 10/555,752

(22) PCT Filed: May 5, 2004

(86) PCT No.: PCT/IB2004/050591

§ 371 (c)(1), (2), (4) Date: Nov. 4, 2005

(87) PCT Pub. No.: WO2004/100165

PCT Pub. Date: Nov. 18, 2004

(65) Prior Publication Data
US 2007/0041281 A1 Feb. 22, 2007

(30) Foreign Application Priority Data
May 9, 2003 (EP) .................................. 03101297

(51) Int. Cl.
*G11B 21/08* (2006.01)
*G11B 7/085* (2006.01)

(52) U.S. Cl. .................................... 369/30.04; 369/100

(58) Field of Classification Search .............. 369/13.21, 369/30.12, 30.04, 100, 124.01
See application file for complete search history.

(56) References Cited

U.S. PATENT DOCUMENTS

| 4,901,300 | A | 2/1990 | Van Der Zande et al. |
| 5,187,699 | A | 2/1993 | Raaymakers et al. |
| 6,538,982 | B1 | 3/2003 | Van Vlerken et al. |
| 2003/0012375 | A1 | 1/2003 | Sako et al. |
| 2003/0063545 | A1* | 4/2003 | Suzuki ..................... 369/59.25 |
| 2003/0202443 | A1* | 10/2003 | Nakagawa et al. ........ 369/53.18 |
| 2003/0223338 | A1* | 12/2003 | Sasaki ..................... 369/53.21 |

FOREIGN PATENT DOCUMENTS

| GB | 2344925 A | 6/2000 |
| JP | 2003263842 | 9/2003 |
| WO | 0043996 A1 | 7/2000 |
| WO | 02075735 A1 | 9/2002 |

* cited by examiner

*Primary Examiner*—Peter Vincent Agustin
*Assistant Examiner*—Andrew J Sasinowski

(57) ABSTRACT

A device for recording information writes marks in a track on a record carrier of a writable type. The device records the information according to a predefined recording format like DVD for constituting a recording area containing user data preceded by a lead-in zone and followed by a lead-out zone located at the end of the user data. The device has a lead-out unit for finalizing the record carrier for playback on a reading device for read-only type record carriers. The finalizing starts with determining if data written in the recording area extends up to a predefined physical position. If the data extends at least up to the predefined position, no lead-out information is recorded, and if not, lead-out information is recorded up to the predefined position.

9 Claims, 3 Drawing Sheets

Figure 2:
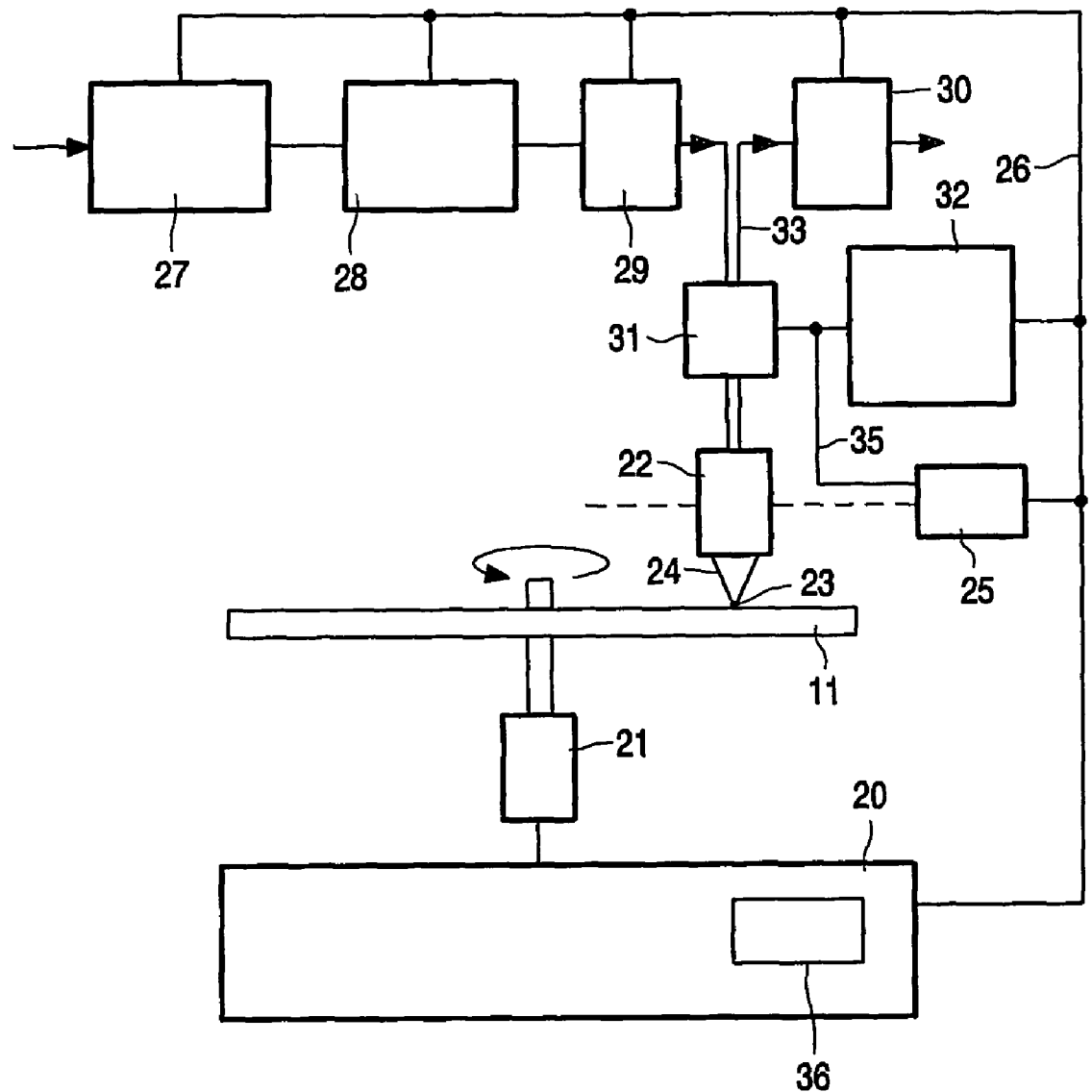

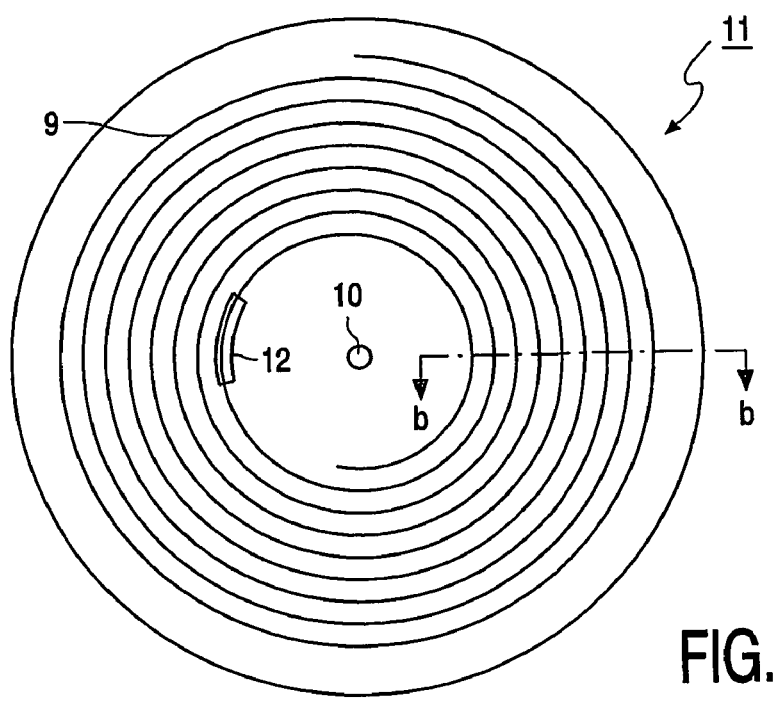
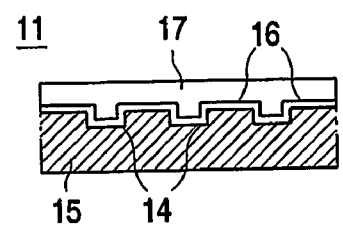
FIG. 1b
FIG. 1a
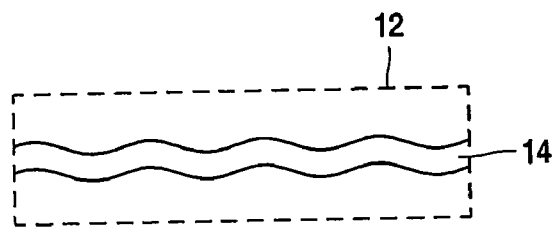
FIG. 1c

METHOD FOR RECORDING A LEAD-OUT ON AN OPTICAL DISC

The invention relates device for recording information on a record carrier of a writable type by writing marks in a track.

The invention further relates to a method and computer program product for recording the record carrier.

A device and method for recording an optical record carrier are known from WO00/43996. The record carrier has a pre-track pattern constituted by a guide groove, usually called pregroove, for indicating the position of tracks in which the information is to be recorded. The information is formatted according to a predefined recording format (for example DVD, Digital Versatile Disc) and represented by recording optically readable marks. The pregroove is meandering by a periodic excursion of the track in a transverse direction (further denoted as wobble). The wobble may be varied in period according to additional information such as addresses. A recording device is provided with a head for generating a beam of radiation for scanning the track and writing the marks. When the writable type record carrier is to be read in a playback device that cannot detect the pregroove the playback device will, according to the predefined recording format, expect a fully recorded disc, in particular a lead-out zone being present at the end of the recorded data A problem of the known recording system recording the lead-out requires additional time, in particular when the user has decided that he wants to finish the recording session, which causes annoying delays for the user.

Therefore it is an object of the invention to provide a device and method for recording information for preventing delays when the record carrier needs to be prepared for use in a playback device.

According to a first aspect of the invention the object is achieved with a device for recording information on a record carrier of a writable type by writing marks in a track on a recording layer via a beam of radiation, the recording layer comprising a pre-track pattern indicating the position of the track, the device comprising a head for providing the beam, recording means for recording the information in the track according to a predefined recording format for constituting a recording area containing user data preceded by a lead-in zone located at the start of the recording layer and followed by a lead-out zone located at the end of the user data, and lead-out means for finalizing the record carrier for playback on a reading device that cannot detect the pre-track pattern, the finalizing comprising determining if data written in the recording area extends up to a predefined physical position, and, if not, recording lead-out information, and, if the data extends at least up to the predefined position, not recording any lead-out information.

The effect of the measures is that, in the case that a minimal amount of data is written in the recording area extending beyond the predefined physical position, no time is needed for writing a lead-out. This has the advantage for the user that the disc will be ready for playback immediately. It is to be noted that even writing a short lead-out would require accessing the end of the user data in the recording area, and possibly also the control data in the lead-in zone, which will cause a noticeable delay. Accessing a new location may take up to 0.5 sec in consumer type recording devices.

The invention is also based on the following recognition. The record carrier needs to be readable on existing reading devices, for example DVD (Digital Versatile Disc) players. The reading devices will perform a disc loading procedure in a predictable way; in particular each reading device is required to retrieve predefined control data from a known area on the record carrier, because the record carrier is formatted according to a predefined standard. The inventors have seen that reading of the lead-out area is practically never part of such a loading procedure. Only a recorded area in the lead-in zone and at the start of the recording area is used during the disc loading procedure. Also during playback the reading device will not try to access any data beyond the recorded user data. Hence in a practical standardized environment, the inventors have seen that if a predefined minimal range has been recorded, no lead-out is required. The unrecorded area will not hamper a reading device in any way.

In an embodiment of the device lead-out means are arranged for said determining using as the predefined physical position a minimal radial position substantially less than a prescribed radial position prescribed in said predefined recording format, in particular the recording format being DVD and the minimal position being 29.0 mm. The inventors have seen that practical playback devices do not need the written area as prescribed, but only a substantially smaller area up to the minimal position. In the case that the record carrier needs to be finalized having only a small amount of user data unnecessarily recording the area from the minimal to the prescribed position might have taken as long as 15 minutes.

In an embodiment of the device the lead-out means are arranged for recording dummy information as said recording lead-out information, the dummy information being formatted as user data. It is noted that the recording area may not contain any data formatted as lead-out data in between user data. Hence in a second recording session old lead-out data must be removed by overwriting. Using dummy data instead of lead-out data for recording temporary lead-out information has the advantage that whenever finalizing is required, no overwriting is needed, which further reduces the delay for the user.

Figure 3:
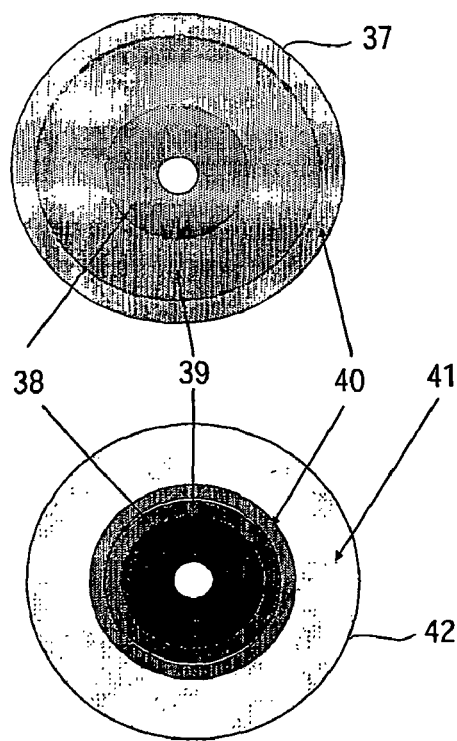
Figure 4:
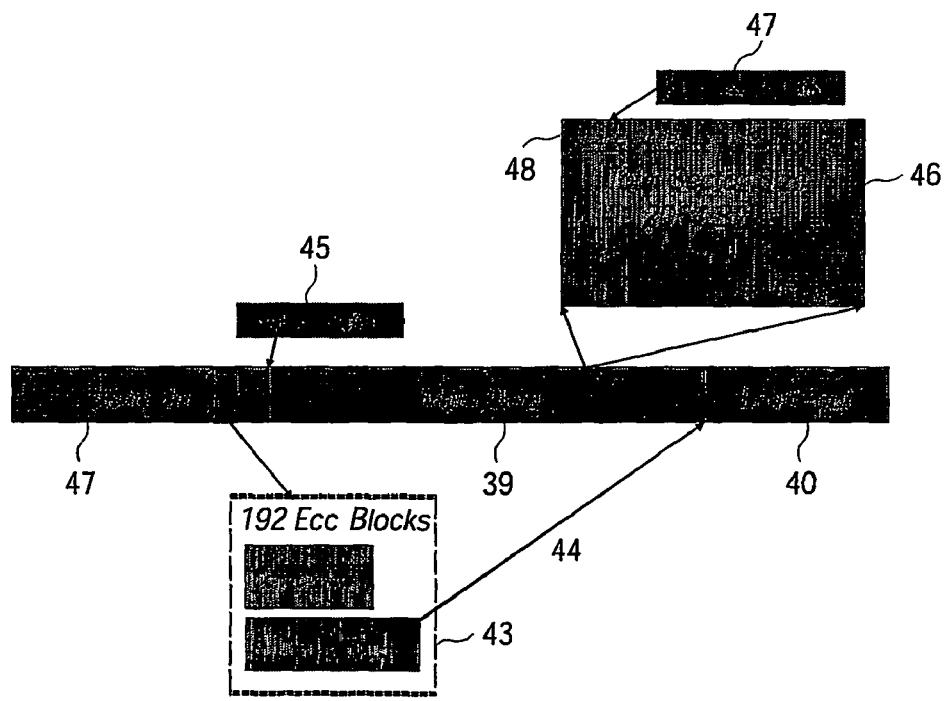

These and other aspects of the invention will be apparent from and elucidated further with reference to the embodiments described by way of example in the following description and with reference to the accompanying drawings, in which FIG. 1a shows a disc-shaped record carrier (top view),
FIG. 1b shows a cross-section taken of the record carrier,
FIG. 1c shows an example of a wobble of the track,
FIG. 2 shows a recording device having a lead-out recording function,
FIG. 3 shows a record carrier having information according to a predefined recording format, and
FIG. 4 shows a logical layout of a recordable disc according to the DVD recording format.

In the Figures, elements which correspond to elements already described have the same reference numerals.

FIG. 1a shows a disc-shaped record carrier 11 having a track 9 and a central hole 10. The track 9 is arranged in accordance with a spiral pattern of turns constituting substantially parallel tracks on an information layer. The record carrier may be an optical disc having an information layer of a recordable type. Examples of a recordable disc are the CD-R and CD-RW, and the DVD+RW. The track 9 on the recordable type of record carrier is indicated by a pre-track structure provided during manufacture of the blank record carrier, for example a pregroove. Recorded information is represented on the information layer by optically detectable marks recorded along the track. The marks are constituted by variations of a first physical parameter and thereby have different optical properties than their surroundings. The marks are detectable by variations in the reflected beam, e.g. variations in reflection.

FIG. 1b is a cross-section taken along the line b-b of the record carrier 11 of the recordable type, in which a transparent substrate 15 is provided with a recording layer 16 and a protective layer 17. The pre-track structure is constituted, for example, by a pregroove 14 which enables a read/write head to follow the track 9 during scanning. The pregroove 14 may be implemented as an indentation or an elevation, or may consist of a material having a different optical property than the material of the pregroove. The pregroove enables a read/write head to follow the track 9 during scanning. A pre-track structure may also be formed by regularly spread sub-tracks or pre-pits which periodically cause servo signals to occur. The record carrier may be intended to carry real-time information, for example video or audio information, or other information, such as computer data.

FIG. 1c shows an example of a wobble of the track. A detail 12 of the track 9 shows a periodic variation of the lateral position of the pregroove 14, also called wobble. The variations cause an additional signal to arise in auxiliary detectors, e.g. in the push-pull channel generated by partial detectors in the central spot in a head of a scanning device. The wobble is, for example, frequency modulated and position information is encoded in the modulation. A comprehensive description of the prior art wobble as shown in FIG. 1c in a writable CD system comprising disc information encoded in such a manner can be found in U.S. Pat. No. 4,901,300 (PHN 12.398) and U.S. Pat. No. 5,187,699 (PHQ 88.002).

During readout by scanning the wobble modulation is detectable via a second type of variations of the radiation, such as variation of intensity in the cross section of the reflected beam detectable by detector segments or additional detectors for generating tracking servo signals. Detecting the wobble for a tracking servo system is well known from the above mentioned CD-R and CD-RW system. The wobble modulation is used to encode physical addresses and control information, for example as in the DVD+RW system and in U.S. Pat. No. 6,538,982.

FIG. 2 shows a recording device having a lead-out recording function. The device is provided with means for scanning a track on a record carrier 11 which means include a drive unit 21 for rotating the record carrier 11, a head 22, a servo unit 25 for positioning the head 22 on the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. The focusing and tracking actuators are driven by actuator signals from the servo unit 25. For reading the radiation reflected by the information layer is detected by a detector of a usual type, e.g. a four-quadrant diode, in the head 22 for generating detector signals coupled to a front-end unit 31 for generating various scanning signals, including a main scanning signal 33 and error signals 35 for tracking and focusing. The error signals 35 are coupled to the servo unit 25 for controlling said tracking and focusing actuators. The error signals 35 are also coupled to a pre-track demodulation unit 32 for retrieving the physical addresses and other control information from the pre-track pattern constituted by wobble modulation or pre-pits. The main scanning signal 33 is processed by read processing unit 30 of a usual type including a demodulator, deformatter and output unit to retrieve the information.

The device is provided with recording means for recording information on a record carrier of a writable or re-writable type, for example DVD+RW, according to a predefined recording format for read-only type record carriers such as DVD. The recording means cooperate with the head 22 and front-end unit 31 for generating a write beam of radiation, and comprise write processing means for processing the input information to generate a write signal to drive the head 22, which write processing means comprise an input unit 27, a formatter 28 and a modulator 29. For writing information the beam of radiation is controlled to create optically detectable marks in the recording layer. The marks may be in any optically readable form, e.g. in the form of areas with a reflection coefficient different from their surroundings, obtained when recording in materials such as dye, alloy or phase change material, or in the form of areas with a direction of polarization different from their surroundings, obtained when recording in magneto-optical material.

Writing and reading of information for recording on optical disks and formatting, error correcting and channel coding rules are well-known in the art, e.g. from the CD or DVD system. In an embodiment the input unit 27 comprises compression means for input signals such as analog audio and/or video, or digital uncompressed audio/video. Suitable compression means are described for video in the MPEG standards, MPEG-1 is defined in ISO/IEC 11172 and MPEG-2 is defined in ISO/IEC 13818. The input signal may alternatively be already encoded according to such standards.

The control unit 20 controls the recording and retrieving of information and may be arranged for receiving commands from a user or from a host computer. The control unit 20 is connected via control lines 26, e.g. a system bus, to the other units in the device. The control unit 20 comprises control circuitry, for example a microprocessor, a program memory and interfaces for performing the procedures and functions as described below. The control unit 20 may also be implemented as a state machine in logic circuits. According to the invention the control unit has a lead-out unit 36 for recording of a lead-out under the conditions as described below. In an embodiment the lead-out recording function is implemented in a computer program for a PC having a recording unit, e.g. a DVD+RW drive.

The recording means, including control unit 20, formatter 28, and modulator 29, are for recording the information in the track according to a predefined recording format for constituting a recording area containing user data preceded by a lead-in zone located at the start of the recording layer and followed by a lead-out zone located at the end of the user data.

FIG. 3 shows a record carrier having information according to a predefined recording format. A first record carrier 37 is fully recorded (upper disc) and a second record carrier 42 (lower disc) is only partly recorded, and still has a blank area 41. Both discs have a central area not having any recorded information. Radially next lies a lead-in zone 38 having a predefined starting and ending radius. Adjacent to the end of the lead-in 38 a recording area for main data 39 begins. Adjacent to the end of the recorded main data a lead-out zone 40 is provided. The examples given below relate to DVD recordable discs such as DVD+RW and DVD-RW. Recording of discs should be such that compatibility with DVD-ROM drives is guaranteed. Other recording formats have similar requirements.

The recording device is provided with a lead-out unit 36, for example implemented as a function of the control unit 20.

The lead-out unit is for finalizing the record carrier for playback on a reading device that cannot detect the pre-track pattern. The finalizing function starts with determining how much data is written in the recording area. If the written data extends up to a predefined physical position, e.g. 35 mm, recording lead-out information is skipped. If the data does not extend up to the predefined position, lead-out information is recorded at the end of the user data in the recording area. The lead-information may be recorded exactly as prescribed by the predefined recording format, i.e. at least 1 mm indicating the lead-out type of data in the sector headers as shown in FIG. 4.

FIG. 4 shows a logical layout of a recordable disc according to the DVD recording format. Recordable discs, once written, have a lead-in area, a data area, and a lead-out area, which need not extend to the end of the disc. In DVD four "areas" are defined: lead-in zone 38, main-data 39, middle area (only for dual layer discs) and a lead-out zone 40. The main data are 39 starts at a fixed address 45, for DVD the address is 0x30000. The data in each area is marked corresponding to the area by a two bit indicator 47 in the header 48 of each sector 46. A group of 16 sectors 46 together constitutes a block including error correction codes, usually called an ECC block, which is the smallest unit of data that can be recorded. A DVD disc according to the DVD read-only standard contains three contiguously written areas: a lead-in, main-data area and lead-out.

A recordable disc initial is a blank disc without any data, only having a pre-track pattern as described above with reference to FIG. 1. Unwritten areas are not accessible to a read-only device that cannot detect the pre-track pattern, and are called "ice". Hence, the first state of every disc is totally iced. The next disc state, areas will be written with data. A first step of writing usually is by the "Format" command. In response to this command, the drive will write the lead-in. Via "write" commands, the main-data area will be filled and via a "Close-Track Session" command, the recording session will be ended and the lead-out may be recorded. The lead-out need not extend to the end of the disc. Thus the end of the disc may still be iced. In a third disc state, a next recording session is performed on a disc already containing data. The main-data may be extended over previously written lead-out information and a new lead-out will be written.

According to the DVD recording format the lead-in contains a control data zone having control data 43 in 192 consecutive ECC blocks. The control data contains physical format information, for example a pointer 44 to the end of user data (bytes 9-11 indicate the end sector number of the data area, see Table 3.4.1.3.1-2 in the DVD standard). Hence at a "close track session" command, or eject or power-down, the lead-out zone is determined. As a consequence the control data in the lead-in area must be updated. At that point, the lead-in area reflects the state of the recordable disc. In a recordable disc further control data may need to be updated. For example in DVD+RW, the FDCB (Format Disc Control Block) is to be updated to indicate the state of the disc, in particular a last written address is recorded in bytes $D_{48}$ to $D_{51}$.

The DVD standard prescribes writing of the lead-out area to at least 35 mm (radially) of the disc (see item 2.6.8 of DVD Specification for Read-Only Disc/Part 1. Physical Specifications Version 1.01). Below 35 mm, if the data area has not been filled up till 35 mm, a zero-filled lead-out area needs to be written. Such zero-filling may take up to 13 minutes on a recording device having a nominal disc recording speed. Beyond 35 mm, the lead-out area should be at least 1 mm (radially, see also the above DVD specification, item 2.6.8 and FIGS. 2.6-1). In this respect, it is to be realized that, at CLV (Constant Linear Velocity), more ECC (Error Correction Blocks) are to be written at a more exterior disc position along the track. Thus the time to write the lead-out depends on the radius. For example, if the lead-out begins at 45 mm and the recording speed is 1×DVD, then the time to write the lead-out is about 110 sec. In an embodiment of the invention data is written as lead-out information up to the prescribed radius of 35 mm, and beyond 35 mm no lead-out information is written. Hence the recording of lead-out information starts at the end of the user data and ends at the predefined physical position.

According to an embodiment of the invention lead-out information is only recorded up to a minimal position. In practice DVD-ROM drives only need 29 mm lead-out area to recognize a recorded disc and to playback the recorded disc. Hence in this respect, a recordable disc may have so-called iced (unwritten areas/crystalline state of the recording layer) areas beyond 29 mm and must be de-iced (having written areas/amorph state of the recording layer) up to the minimal position. Beyond said 29 mm no lead-out area is written or zero-filling is performed. Hence the lead-out recording is according to the following set of recording rules:

if the last written data block is below 29 mm, then a lead-out area is written that fills up the disc up till 29 mm if the last written data block is beyond 29 mm, no lead-out area is written (zero lead-out area).

By not recording from 29 mm to 35 mm, the amount of time saved at 1×DVD is 7 minutes. Not recording a lead-out saves time by itself. At 57 mm, the time to write the lead-out at 1×DVD is 86 sec.

By not recording temporary lead-out information, further time is saved by reducing overwrite time and administration time as follows. DVD+RW is a random access medium. If a temporary lead-out is written previously, a user may chose to write at some address beyond it. To make the disc DVD-ROM compliant, the drive must then take care that all of the old lead-out blocks are overwritten. Otherwise, the disc will contain lead-out blocks in the middle of written user-data blocks. This may disturb the read-out process in a playback device. By not writing a temporary lead-out beyond the predefined physical position, the drive only has to overwrite lead-out blocks up to the predefined physical position.

In an embodiment recording the lead-out information up to the predefined physical position is performed as follows. In a lead-out zone normally (according to the DVD standard) the indicator 47 should indicate lead-out data. In the embodiment dummy data indicating the user data type is written instead of lead-out type data. By never writing a temporary lead-out, the drive never has to take care that those blocks be overwritten. Hence dummy information is recorded up to the predefined physical position, and the dummy information is formatted as user data.

In an embodiment the recording of dummy information up to the predefined physical position is performed in a background mode in between recording of user data, for example during recording variable rate video some time will be available for background recording tasks. Dummy information is recorded contiguously from the start of the recording area (or the end of the user data if some user data has already been written) up to the predefined physical position. This has the advantage of reducing the finalization time needed before recording can be ended.

In an embodiment the lead-out means 36 are arranged for determining the amount of data written in the recording area by retrieving a "last written address parameter" from the record carrier. The "last written address parameter" indicates a last sector number of a contiguously recorded part of the recording area starting from the start of the recording area. For example in DVD+RW, the FDCB (Format Disc Control Block) includes a last written address in bytes $D_{48}$ to $D_{51}$.

Although the invention has been mainly explained by embodiments using optical discs according to the DVD standard, the invention is also suitable for other standards like BD (Blue-ray Disc) and other record carriers such as rectangular optical cards, magneto-optical discs or any other type of information storage system that has a pre-applied track pattern on a writable record carrier. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software. Further, the scope of the invention is not limited to the embodiments, and the invention lies in each and every novel feature or combination of features described above.

The invention claimed is:

1. A device for recording information on a record carrier of a writable type by writing the information on a track on a recording layer of said record layer via a beam of radiation, said recording layer comprising a pre-track pattern indicating the position of the track, the device comprising:
   a head for providing the beam of radiation;
   recording means for recording the information with the beam of radiation from the head in the track according to a predefined recording format for constituting a recording area containing user data preceded by a lead-in zone located at the start of the recording layer and followed by a lead-out zone located at the end of the user data; wherein said recording means corporate with the head for said recording of the information;
   a lead-out means included in said recording means for finalizing the record carrier for playback on a reading device that cannot detect the pre-track pattern, the finalizing comprising determining if data written in the recording area extends up to a predefined physical position, and, if not, recording lead-out information with the recording means, and, if the data extends at least up to the predefined position, not recording any lead-out information.

2. The device as claimed in claim 1, wherein the lead-out means are arranged for said determining using as the predefined physical position a prescribed radial position prescribed in said predefined recording format, the recording format being DVD and the prescribed physical position being 35.0 mm.

3. The device as claimed in claim 1, wherein the lead-out means are arranged for said determining using as the predefined physical position a minimal radial position substantially less than a prescribed radial position prescribed in said predefined recording format, the recording format being DVD and the minimal position being 29.0 mm.

4. The device as claimed in claim 1, wherein the lead-out means are arranged for said recording lead-out information starting at the end of the user data and ending at the predefined physical position.

5. The device as claimed in claim 1, wherein the lead-out means are arranged for recording dummy information as said recording lead-out information, the dummy information being formatted as user data.

6. The device as claimed in claim 1, wherein the lead-out means are arranged for recording dummy information as said recording lead-out information up to the predefined physical position, the dummy information being formatted as user data, and the recording being performed in a background mode in between recording of user data.

7. The device as claimed in claim 1, wherein the lead-out means are arranged for said determining if data written in the recording area extends up to a predefined physical position by retrieving a last written address parameter from the record carrier, which last written address parameter indicates a last sector number of a contiguously recorded part of the recording area starting from the start of the recording area.

8. A method of recording information on a record carrier of a writable type by writing marks in a track on a recording layer of said record carrier via a beam of radiation, the recording layer comprising a pre-track pattern indicating the position of the track, the method comprising the step of:
   recording the information in the track according to a predefined recording format for constituting a recording area containing user data preceded by a lead-in zone located at the start of the user data and followed by a lead-out zone located at the end of the user data; and
   finalizing the record carrier for a playback performed by a reading device that cannot detect the pre-track pattern, the finalizing comprising determining if data written in the recording area extends up to a predefined physical position, and, if not, recording lead-out information, and, if the data extends at least up to the predefined position, not recording any lead-out information.

9. A computer program product stored on a recordable medium for recording information, which program is operative to cause a processor of a computer to perform the steps of:
   recording the information in the track according to a predefined recording format for constitutional a recording area containing user data preceded by a lead-in zone located at the start of the recording layer and followed by a lead-out zone located at the end of the user data; and
   finalizing the record carrier for playback performed by a reading device that cannot detect the pre-track pattern, the finalizing comprising determining, if data written in the recording area extends up to a predefined physical position, and, if not, recording lead-out information, and, if the data extends at least up to the predefined position, not recording any lead-out information.

* * * * *